US009373994B2

(12) United States Patent
Gialdella

(10) Patent No.: US 9,373,994 B2
(45) Date of Patent: Jun. 21, 2016

(54) ENERGY CONVERSION APPARATUS WITH TUNED CIRCUIT

(71) Applicant: Gerald Gialdella, Shelbyville, TN (US)

(72) Inventor: Gerald Gialdella, Shelbyville, TN (US)

( * ) Notice: Subject to any disclaimer, the term of this patent is extended or adjusted under 35 U.S.C. 154(b) by 0 days.

(21) Appl. No.: 14/679,418

(22) Filed: Apr. 6, 2015

(65) Prior Publication Data

US 2015/0214880 A1 Jul. 30, 2015

Related U.S. Application Data

(63) Continuation-in-part of application No. 13/624,236, filed on Sep. 21, 2012, now Pat. No. 9,000,689.

(60) Provisional application No. 61/538,372, filed on Sep. 23, 2011.

(51) Int. Cl.
| | |
|---|---|
| *F16D 65/14* | (2006.01) |
| *H02K 7/06* | (2006.01) |
| *H02P 1/00* | (2006.01) |
| *H02P 3/00* | (2006.01) |
| *H02K 53/00* | (2006.01) |
| *H02P 27/06* | (2006.01) |
| *H02M 5/44* | (2006.01) |
| *H02K 33/16* | (2006.01) |
| *H02K 35/02* | (2006.01) |
| *H02K 16/00* | (2006.01) |

(52) U.S. Cl.
CPC ............... *H02K 53/00* (2013.01); *H02K 16/00* (2013.01); *H02K 33/16* (2013.01); *H02K 35/02* (2013.01); *H02M 5/44* (2013.01); *H02P 27/06* (2013.01); *H02K 7/06* (2013.01); *Y10S 74/09* (2013.01)

(58) Field of Classification Search
CPC ........ H02K 53/00; H02K 16/00; H02K 33/16
USPC .................................................... 318/14, 115
See application file for complete search history.

(56) References Cited

U.S. PATENT DOCUMENTS

| 323,652 A | 8/1885 | Farmer |
|---|---|---|
| 357,374 A | 2/1887 | Bock, Jr. |
| 3,105,162 A | 9/1963 | Stevenson |

(Continued)

FOREIGN PATENT DOCUMENTS

WO WO2013044102 3/2013

OTHER PUBLICATIONS

Notification of Transmittal of the International Search Report and the Written Opinion of the International Searching Authority, or the Declaration, Mail Date Nov. 30, 2012.

*Primary Examiner* — Erick Glass
(74) *Attorney, Agent, or Firm* — Knox Patents; Thomas A. Kulaga

(57) ABSTRACT

Apparatus for an electromagnetic engine producing both mechanical and electrical power. The apparatus includes a signal generator, such as a device that plays a pre-recorded signal. The output of the signal generator is connected to an amplifier that is connected to a first coil assembly. The coils are positioned around a cylindrical cavity or sleeve in which a permanent magnet piston reciprocates in response to the amplified signal applied to the coils. A second coil assembly is magnetically coupled to the first coil assembly. The second coil assembly includes a tuned circuit and provides an electrical output. The tuned circuit of the second coil assembly includes a coil and a capacitor selected for a specific frequency.

20 Claims, 9 Drawing Sheets

(56) References Cited

U.S. PATENT DOCUMENTS

| | | |
|---|---|---|
| 3,832,608 A | 8/1974 | Mills |
| 3,886,419 A | 5/1975 | Omura et al. |
| 4,228,373 A | 10/1980 | Funderburg |
| 4,317,058 A | 2/1982 | Blalock |
| 4,404,503 A | 9/1983 | Ward et al. |
| 4,507,579 A | 3/1985 | Turner |
| 4,631,455 A | 12/1986 | Taishoff |
| 6,774,588 B2 | 8/2004 | Ibuki et al. |
| 7,227,485 B2 | 6/2007 | Hiscocks |
| 2004/0007998 A1 | 1/2004 | Yasohara et al. |
| 2006/0208600 A1 | 9/2006 | Sahyoun |
| 2010/0308760 A1 | 12/2010 | Nakamura |
| 2013/0076722 A1 | 3/2013 | Gialdella |

ENERGY CONVERSION APPARATUS WITH TUNED CIRCUIT

CROSS-REFERENCE TO RELATED APPLICATIONS

This application is a continuation-in-part of prior Application Ser. No. 13/624,236, filed Sep. 21, 2012, which claims the benefit of U.S. Provisional Application No. 61/538,372, filed Sep. 23, 2011.

STATEMENT REGARDING FEDERALLY SPONSORED RESEARCH OR DEVELOPMENT

Not Applicable

BACKGROUND

1. Field of Invention

This invention pertains to energy conversion devices. More particularly, this invention pertains to an electronic signal amplified to drive an electro-mechanical engine that outputs mechanical motion and includes a tuned circuit that outputs electrical power.

2. Description of the Related Art

Many have attempted to make a practical electro-magnetic reciprocating engine. These engines energize a coil to induce relative motion in a magnet or a magnetically responsive material attached to a mechanical assembly.

For example, U.S. Pat. No. 3,832,608 discloses an electro-magnetic motor with a piston surrounded by coil windings. The coil windings are energized by an electrical control assembly that uses transistors to switch the power to each coil winding. Another example of an electro-magnetic reciprocating engine is U.S. Pat. No. 4,317,058, which discloses an electro-magnet that operates on a permanent magnet piston. The electro-magnet is repeatedly energized through a switch.

BRIEF SUMMARY

According to one embodiment of the present invention, an energy conversion device is provided. The energy conversion device includes a driver, a motor configured to be connected to a load, and a tuned circuit coupled to the motor. The driver amplifies a signal. The amplified signal drives a coil that produces a magnetic field that causes a magnet to reciprocate. The coil has an opening in which the magnet moves as a piston. The magnet is connected to a shaft that provides mechanical power to the load. The load receives the reciprocating shaft. The tuned circuit is a coil assembly with an inductor magnetically coupled to the driven coil. The tuned circuit provides electrical power. In one embodiment, the load converts the reciprocating motion into rotary motion that powers a rotary device. In one such embodiment, the load includes a rotary generator that is electrically connected to a power supply that provides power to the driver and/or charges a battery that provides power to the driver.

In another embodiment, the load includes a linear generator in which the reciprocating shaft moves a magnet that induces a voltage in a coil. In one such embodiment, the linear generator is electrically connected to a power supply that provides power to the driver and/or charges a battery that provides power to the driver.

The driving signal is configured to efficiently operate the motor without requiring high current rated switches. In one embodiment the signal is provided by a signal generator and signal processor. In another embodiment, the signal is digitally produced and/or manipulated, In another embodiment, the signal is provided by either a digital or analog player that provides an output signal. The signal, in one embodiment, includes a starting portion and a running portion. The starting portion of the signal includes snippets or partial waveforms at intervals suitable for starting the motor from a stopped state. The running portion of the signal includes a series of snippets or a waveform suitable for running the motor in a steady state condition. In another embodiment, the signal is generated by looping a preselected snippet or short segment, that is, a signal of a predefined length is repeated or looped to produce a continuous signal. In yet another embodiment, multiple signals are stored for selection as required for various starting torques and steady state speeds.

BRIEF DESCRIPTION OF THE SEVERAL VIEWS OF THE DRAWINGS

The above-mentioned features will become more clearly understood from the following detailed description read together with the drawings in which.

DETAILED DESCRIPTION

An apparatus for energy conversion is disclosed. The energy conversion device is generally indicated as 100, with particular embodiments and variations shown in the figures and described below have an alphabetic suffix, for example, 100-A.

Figure 1:
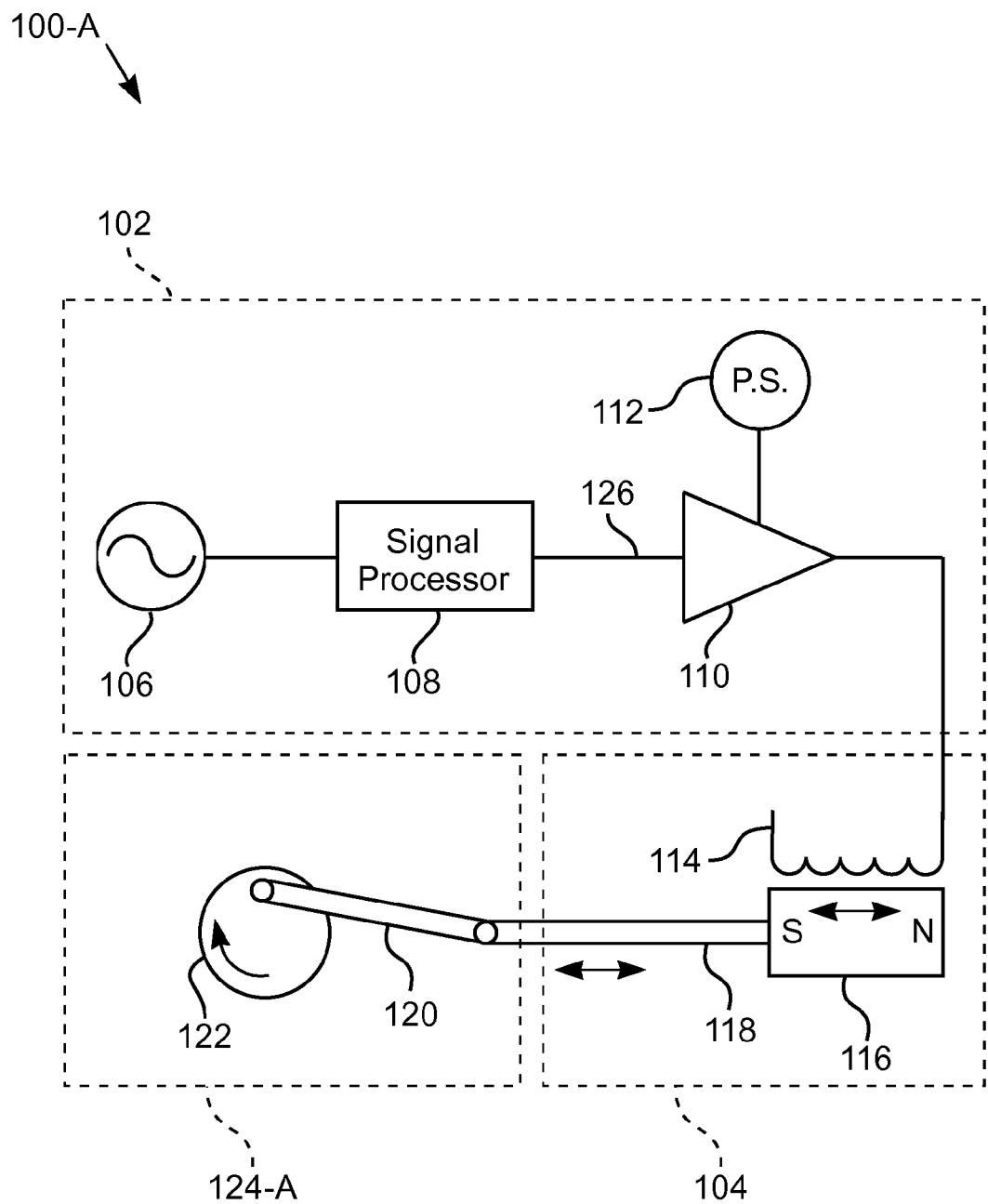
FIG. 1 a simplified block diagram of one embodiment of an energy conversion device.

FIG. 1 illustrates a simplified block diagram of one embodiment of an energy conversion device 100-A. The energy conversion device 100-A includes a driver 102 and a motor 104. The motor is generally indicated as 104, with particular embodiments shown on the figures and described below with an alphabetic suffix, for example, 104-A. The motor 104 is connected to a load 124-A. The driver 102 provides power to and energizes the motor 104, which converts the electrical energy from the driver 102 to reciprocal mechanical motion and the illustrated load 124-A is a rotary device powered by the reciprocal motion.

The driver 102 includes a signal generator 106, a signal processor 108, and an amplifier 110. The signal generator 106 has on output connected to an input to a signal processor 108. The signal processor 108 output is a signal 126 provided to the amplifier 110. Power to the amplifier 110 is provided by a power supply 112. The amplifier 110 provides an amplified signal that drives the motor 104. The signal generator 106 and the signal processor 108 are a signal source that provides an output that is a signal 126, such as a signal 126 defined by programmed characteristics or produced from a recorded signal, such as a digital player.

In the illustrated embodiment, the signal generator 106 provides a signal that is processed by the signal processor 108. In various embodiments, the signal processor 108 provides impedance matching between the signal generator 106 and/or otherwise processes the output from the signal generator 106, such as waveform shaping and clipping. The signal 126 in one embodiment is a recorded signal with a specific waveform. In one embodiment, the signal generator 106 and signal processor 108 are incorporated in a single device, such as a player 902.

The motor 104 includes a coil 114 that receives the amplified signal from the driver 102. The coil 114 is wound with a central opening in which a magnet 116 moves longitudinally. The magnet 116 is connected to a shaft 118 to maintain motion of the magnet 116 and shaft 118 along a single axis.

The energy conversion device 100, in various embodiments, includes a mechanical load 124-A and/or an electrical load such as a generator 124-B. The illustrated load 124-A receives the reciprocating motion of the shaft 118, which is connected to a rod 120. The opposite end of the rod 120 is connected to a rotary device 122, such as a crankshaft. In one embodiment the rotary device 122 includes a flywheel, that is, the rotary device 122 has sufficient moment of inertia to store rotational energy. The rotary device 122 turns as a result of the reciprocating motion of the shaft 118. The rotary motion of the rotary device 122 is available for use to power a device that requires rotary motion as an input, for example, an alternator, a generator, or a transmission connected to one or more wheels of a vehicle.

Figure 2:
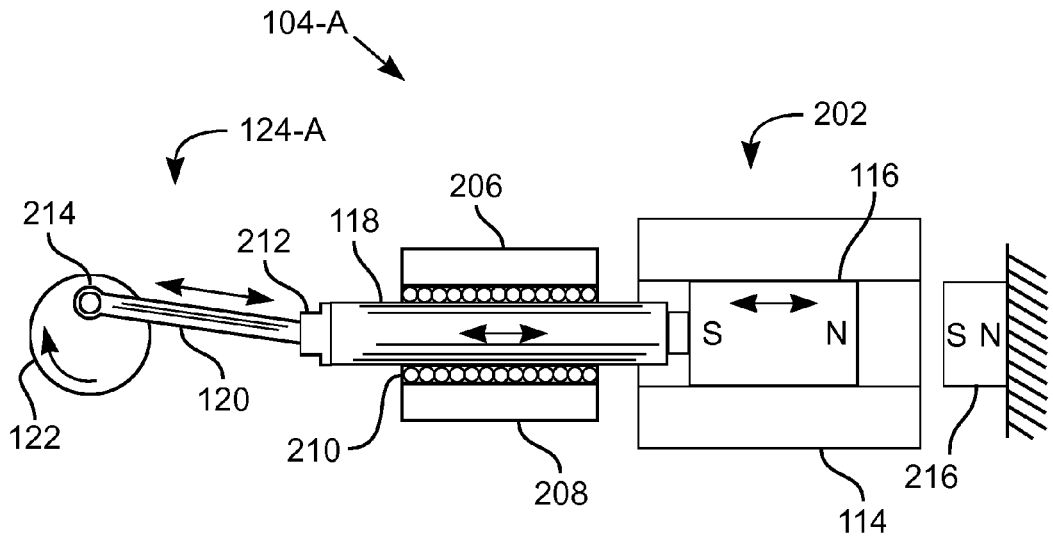
FIG. 2 is an illustration of one embodiment of a motor and load for an energy conversion device as in FIG. 1.

FIG. 2 is an illustration of one embodiment of a motor 104-A and load 124-A such as depicted in FIG. 1. The motor 104-A includes an electro-magnet driver assembly 202 and a shaft 118. The electro-magnet driver assembly 202 includes a coil 114 and a magnet 116. The coil 114 is wound around a cylinder. The cylinder contains the magnet 116, which is a reciprocating piston. The magnetic field generated by the coil 114 engages the magnet 116, thereby causing the magnet 116 to move longitudinally inside the cylinder and the coil 114. In one embodiment, the coil 114 is a single wire coil. In another embodiment, the motor 104 includes two wire coils. In other embodiments, the motor 104 includes more than two wire coils. The magnet 116 is connected to the shaft 118.

The shaft 118 is driven along a single axis by the reciprocating movement of the magnet 116. In the illustrated embodiment, the shaft 118 is restrained by a bearing 206. The bearing 206 includes a bearing housing 208 enclosing bearings 210 that restrain movement of the shaft 118 along a single axis. In another embodiment, the bearing 206 is a sleeve bearing such that movement is guided by a stationary hollow cylinder along which the shaft 206 moves linearly. Those skilled in the art will recognize the need for maintaining the movement of the magnet 116 along a single axis, and will understand how to configure a shaft 118 that moves in combination with the magnet 116.

The shaft 118 is connected to the load 124-A. In the illustrated embodiment, the load 124-A includes a rod 120 and a crankshaft or rotary device 122. The shaft 118 is connected to the rod 120 through a pin adapter 212 such that one end of the rod 120 moves linearly in combination with the shaft 118. In the illustrated embodiment, the pin adapter 206 is a wrist pin. Those skilled in the art will recognize that many adapters are available and will understand how to select a pin adapter 206 that is suitable for connecting the shaft 118 to the load 124-A.

The opposite end of the rod 120 is connected to the crankshaft 122 with a pin 214. As the rod 120 moves, the crankshaft 122 turns with a rotary motion. In various embodiments, the crankshaft 122 is connected to a device that receives the rotary motion of the crankshaft 122.

In the illustrated embodiment, an amplified signal 126 is applied to the coil 114 to produce movement in the motor 104, which drives the load 124-A. The analog signal is applied to the coil 114 to produce a magnetic field, which interacts with the magnetic field of the magnet 116. When the magnet 116 moves, the attached shaft 118 moves the rod 120 that is attached to the crankshaft 122. When the analog signal changes, the magnet 116 and shaft 118 move in the opposite direction so that the reciprocating back and forth motion causes the crankshaft 122 to rotate.

FIG. 2 also illustrates the embodiment in which a helper magnet 216 is fixed relative to the magnet 116 in the electromagnet driver assembly 202. In the illustrated embodiment, the polarity of the helper magnet 216 is oriented to apply a weak attraction to the magnet 116. In another embodiment, the polarity of the helper magnet 216 is oriented to weakly repel the magnet 116. The helper magnet 216 positions the magnet 116 and, consequently, the connecting rod 120 on the crankshaft 122 at a desired position when the rotary energy conversion device 100-A is not being operated, that is, when the magnet 116 is in a non-operating state. This allows the motor 104-A and, more importantly, the connecting rod 120 on the crankshaft 122 to be able to start from a known resting position. In one embodiment, the rotary energy conversion device 100-A includes two or more motors 104-A connected to the crankshaft 122. In such an embodiment where the connecting pins 214 are not coinciding and not 180 degrees apart, the helper magnets 216 position the rods 120 on the crankshaft 122 such that the rods 120 are not planar with the axis of rotation of the crankshaft 122, thereby aiding starting of the rotary energy conversion device 100-A from a dead stop because the rods 120 are able to apply torque to the crankshaft 122.

Figure 3:
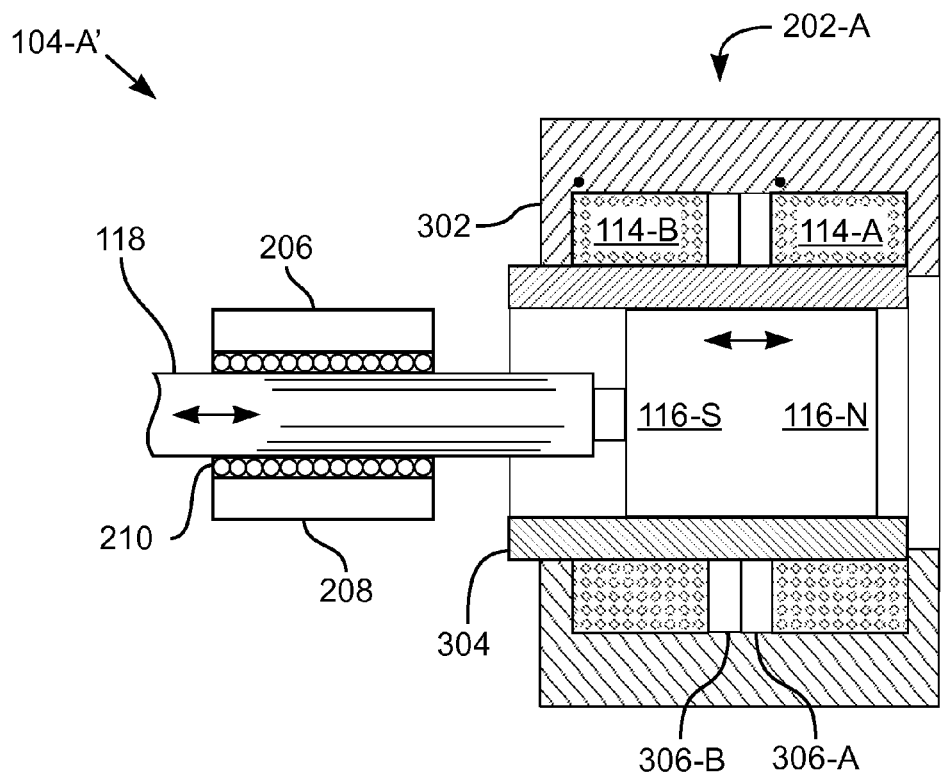
FIG. 3 is an illustration of one embodiment of an electro-magnet driver assembly.

FIG. 3 illustrates another embodiment of a electro-magnet driver assembly 202-A for a motor 104-A'. The electro-magnet driver assembly 202-A includes a metal cylinder 302, that encloses a cylindrical form 304, a first coil 114-A, a second coil 114-B, and a magnet 116 with north and south poles 116-N, 116-S. The metal cylinder 302 is a ferrous, or otherwise magnetic material. A magnet 116 having north and south poles 116-N, 116-S moves linearly within the cylindrical form 304. The cylindrical form 304 is a non-magnetic material that allows passage of magnetic fields. A first coil 114-A is wound around the cylindrical form 304. A second coil 114-B is wound around the cylindrical form 304. In one embodiment, the first coil 114-A and the second coil 114-B are separated by ferrous plates 306-A, 306-B. In another embodiment, the two coils 114-A, 114-B are separated by a non-ferrous spacer. The spacer fixes the axial alignment of the coils 114-A, 114-B relative to the two poles 116-N, 116-S of the magnet 116.

In one embodiment, the coils 114-A, 114-B are wound in opposite directions or are connected such that the magnetic field generated by one of the coils is opposite that of the other coil when both have the same electrical signal applied. In such an embodiment, each of the two coils 114-A, 114-B interacts with a corresponding one of the two poles 116-N, 116-S of the magnet 116. In the illustrated embodiment, the two coils 114-A, 114-B are wound in parallel, as indicated by the polarity dots, but the coils 114-A, 114-B are cross wired. That is, the coils are wired such that positive lead for one coil 114-A is electrically connected to the negative lead of the other coil 114-B. The poles of the magnet 116 are shown for illustration and a person of ordinary skill in the art will recognize the relationship of the poles relative to the coils 114.

In another embodiment, the first coil 114-A and the second coil 114-B are wound in parallel around the cylindrical form 304 such that their magnetic fields coincide. In one embodiment, the first coil 114-A and the second coil 114-B are wound to have an impedance of 4-ohms each. Those skilled in the art will understand that coil impedance is a design consideration and will select coils suitable for use in the electro-magnet driver assembly 202-A, for example, coils of 2, 6, or 8 ohms can be used, along with other impedances. Application of a signal to the coils 114-A, 114-B produces a variation in the strength and polarity of the magnetic field in the metal cylinder 302 in accordance with the variation of the signal.

In one embodiment, the electro-magnet driver assembly 202-A is contained within a housing. The housing serves as a heat sink for dissipation of generated heat and may also contain cavities for fluid transfer to maintain a desired operating temperature range.

Figure 4:
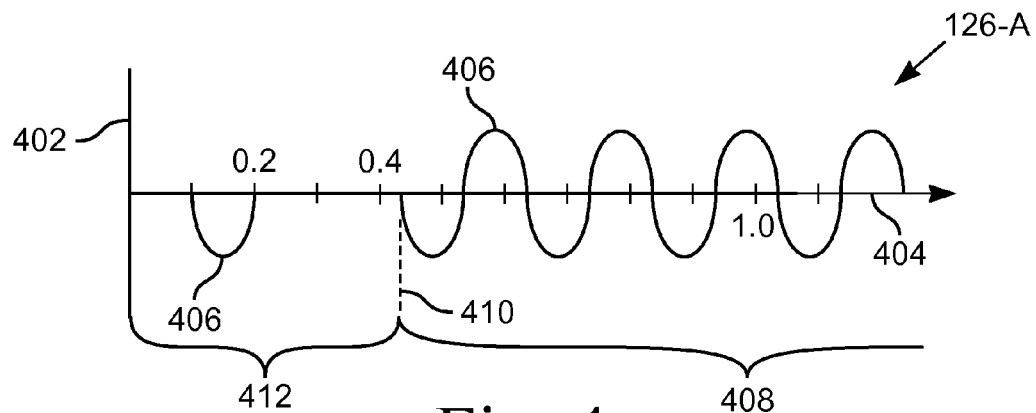
FIG. 4 is an illustration of a graph of one embodiment of a signal for the apparatus of FIG. 1.

FIG. 4 illustrates a graph of one embodiment of a signal 126-A of the driver 102. The amplitude 402 of the signal 126-A over time 404 (in seconds) is shown in the graph. The signal 126-A begins with a duty cycle including a negative half-wave, or snippet, 406 and reaches a loop region 408 of 5 Hz at time 410. The illustrated snippet 406 is a half-wave of an alternating signal with the half-wave being of one polarity, either the negative or positive half of the alternating signal. In one embodiment, the loop region 408 has a frequency of 20 Hz. In other embodiments, the loop region 408 has an operating frequency up to and including 20 Hz, or even higher.

In the illustrated embodiment the signal 126-A has two parts, a starting section 412 and a running, or looping, section 408. The starting section 412 includes one or more snippets 406 at intervals and corresponds to the startup of the motor 104 from a stopped condition. The running section, or loop region 408, includes a series of snippets 406 sequentially ordered. The running section 408 corresponds to the steady state running condition of the motor 104.

A signal 126-A from the signal processor 108 is provided to the amplifier 110 to drive the motor 104. In one embodiment, the signal generator 106 provides a snippet, or a short signal segment, 406. The snippet 406 is a single inverted half-wave. The signal processor 108 modifies and repeats the snippet 406 to provide the signal 126-A shown in FIG. 4. For example, the signal processor 108 is a device that stores the snippet 406, manipulates the snippet 406 to produce the starting section signal. The signal processor 108 then manipulates the snippet 406 to produce the loop region 408, for example by repeatedly playing the snippet 406. To change the speed of the motor 104, the signal processor 108 changes the pitch, tempo, or frequency of the signal 126-A.

Specific sine waves with frequency from 2 to 20 Hz provide the input to the amplifier 110 operating in the infrasonic frequency range. Infrasonic frequencies are those frequencies below the audible level of the human ear. In one such embodiment, the input frequency begins at 2 Hz and is increased to 20 Hz. In other embodiments, the input frequency extends to 40 Hz or higher, depending upon the desired speed of the motor 104.

In one embodiment, a signal 126-A is provided from a 5 Hz signal with a varied duty cycle. The 5 Hz signal is edited to provide smaller peaks. For example, the portion of the snippet 406 illustrated between 0.14 and 0.16 seconds is used instead of the complete half cycle. Varying the width of the portion of the half-cycle while keeping the gap between snippets 406 constant varies the duty cycle. The variation in duty cycle provides torque and speed adjustment capability for the driver 102. In another example, the snippet 406 is a portion of a half-wave signal of one polarity, either the negative or positive half of the alternating signal. For example, for a snippet 406 based on a 5 Hz sine wave, the snippet 406 is a sample of approximately 0.033 seconds encompassing the peak of the half-wave signal. A series of snippets 406 with a selected interval defines a duty cycle, which is the ratio of the snippet 406 width versus the snippet 406 period, which includes the snippet width and the time gap between snippets 406. In one embodiment, the signal processor 108 includes a band pass filter that allows only a selected portion of the snippet 406 to pass to the amplifier 110. In one such embodiment, the signal processor 108 includes a variable band pass filter such that the amount of power from the signal 126 is controlled.

Figure 5:
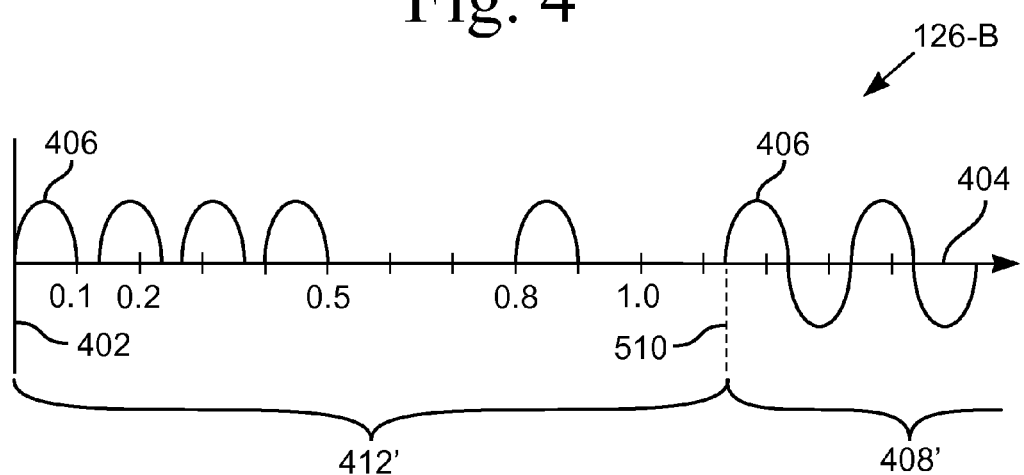
FIG. 5 is an illustration of a graph of another embodiment of a signal for the apparatus of FIG. 1.

FIG. 5 illustrates a graph of another embodiment of a signal 126-B for the amplifier 110. The amplitude 402 of the signal 126-B over time 404 (in seconds) is shown in the graph. The signal 126-B begins with a duty cycle portion having half-wave signals or snippets 406 at selected intervals and reaches a loop region 408' of 5 Hz at time 510. In one embodiment, the loop region 408' is 20 Hz. In one embodiment, the loop region 408' has an operating range up to and including 20 Hz.

An output signal from the signal processor 108 is provided to the amplifier 110 to drive the motor 104. In one embodiment, the signal generator 106 provides a snippet, or a short signal segment, 406. The snippet 406 is a single half-wave. The signal processor 108 uses and modifies the snippet 406 to provide the signal 126-B shown in FIG. 5.

In the illustrated embodiment of the signal 126-B, the signal 126-B has two parts, a starting section 412' and a running section 408'. The starting section 412' includes multiple snippets 406 at intervals and corresponds to the startup of the motor 104 from a stopped condition. The running section, or loop region 408', includes a series of snippets 406 sequentially ordered. The running section 408' corresponds to the steady state running condition of the motor 104.

Figure 6:
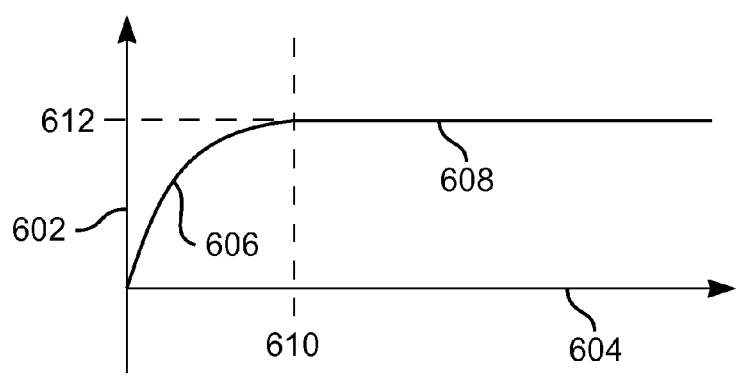
FIG. 6 is an illustration of a graph showing the increase of the signal to a steady state frequency.

FIG. 6 illustrates a graph showing the increase of the frequency of the signal 126 to a steady state frequency 612. The frequency 602 of the signal over time 604 is shown in the graph. During the start-up region 606, the frequency 602 increases until steady state 608 is reached at steady state time 610. After steady state time 610, further increases in time 604 do not increase the frequency 602.

The start-up region 606 corresponds to the startup of the motor 104 from a stopped condition. The steady state 608 corresponds to the steady state running condition of the motor 104.

Figure 7:
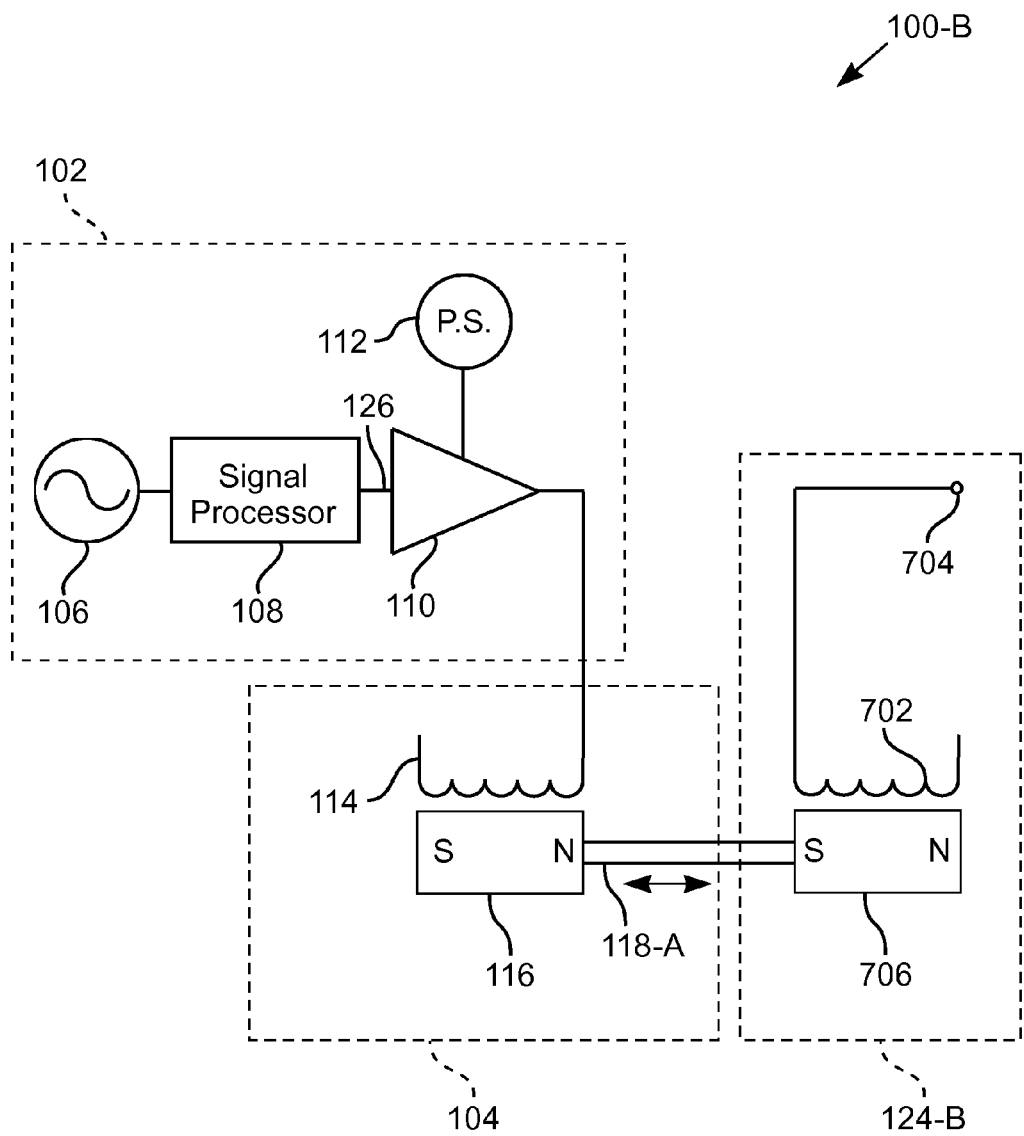
FIG. 7 is a simplified block diagram of another embodiment of an energy conversion device.

FIG. 7 illustrates a simplified block diagram of another embodiment of an energy conversion device 100-B. The energy conversion device 100-B includes a driver 102 and a motor 104. The driver 102 provides power to and energizes the motor 104, which converts the electrical energy from the driver 102 to reciprocal mechanical motion and the illustrated load 124-B is a reciprocal motion generator.

The driver 102 includes a signal generator 106, a signal processor 108, and an amplifier 110. The signal generator 106 provides an input to a signal processor 108. In one embodiment, the signal processor 108 receives a signal from the signal generator 106 and manipulates that signal, such as by changing the pitch, tempo, and/or frequency to control the speed of the motor 104. In one embodiment, the signal 126 has a frequency within the range of 3 to 8 hertz.

The signal processor 108 outputs a signal 126 to the amplifier 110. Power to the amplifier 110 is provided by a power supply 112. The amplifier 110 provides an amplified signal that drives the motor 104. The motor 104 has a shaft 118 that reciprocates. The load 124-B is a reciprocating generator. A magnet 706, similar to the magnet 116 in the motor 104, is magnetically coupled to a coil 702, which is similar to the one in the motor 104, that has an alternating current output 704.

The illustrated energy conversion device 100-B serves many purposes. Because the driver 102 and motor 104 are powered independently of the load 124-B, the energy conversion device 100-B is suitable as an isolated power supply.

Figure 8:
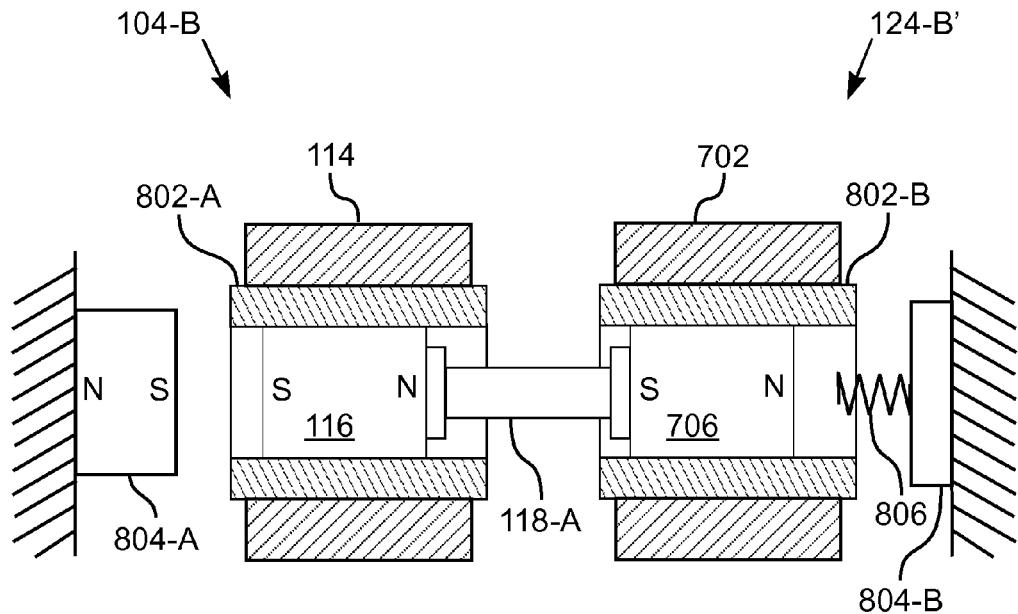
FIG. 8 is a diagram of one embodiment of a motor and load as in FIG. 7.

FIG. 8 is an illustration of one embodiment of a motor 104-B and a load 124-B'. The motor 104-B includes a coil 114 wound around a first cylindrical form 802-A. The magnet 116 fits inside the first cylindrical form 802-A and is free to move along one axis. The motor magnet 116 is attached to a shaft 118-A that is connected to the load magnet 706 in the load 124-B'. The load magnet 706 fits the second cylindrical form 802-B and is free to move along one axis. The load coil 702 is wound around the second cylindrical form 802-B.

The motor coil 114 receives the amplified signal from the driver 102. The magnetic field generated by the motor coil 114 induces motion in the motor magnet 116, which causes the load magnet 706 to move and induce a voltage in the load coil 702.

In the illustrated embodiment, a pair of stops 804-A, 804-B limit the range of motion of the motor magnet 116 and the load magnet 702. The first stop 804-A and the second stop 804-B are positioned to keep the motor magnet 116 and the load magnet 706 within the cylindrical forms 802-A. 804-B during operation. In one such embodiment, the stops 804-A, 804-B are resilient material that absorb the impact energy and release it to help change the direction of the magnets 116, 706. In one such embodiment, the stops 804-A are magnets with a polarity such that the magnet 116 in the motor 104-B and the magnet 706 in the load 124-B' are repelled from the stops 804-A when the magnets 116, 706 approach the stop 804-A when the magnets 116, 706 approach the end of their travel.

In other embodiments, one or a pair of springs 806 are positioned with or in place of the stops 804-A, 804-B. The spring 806 acts to limit the travel of the load magnet 706 and also to absorb the impact energy and release it to help change the direction of the load magnet 706.

In yet another embodiment, the motor 104-B has a second magnet 116 and set of coils 114 with the load 124-B' positioned between the two motors 104-B. In this way twice as many coils 114 are available to drive the load 124-B'. In one such embodiment, the orientation of the second set of coils 114 and the polarity of the second magnet 116 are inverted relative to the illustrated coil 114 and magnet 116. However, a person of ordinary skill in the art will recognize that the magnet polarity and orientation are shown for illustration purposes and can be reversed.

Figure 9:
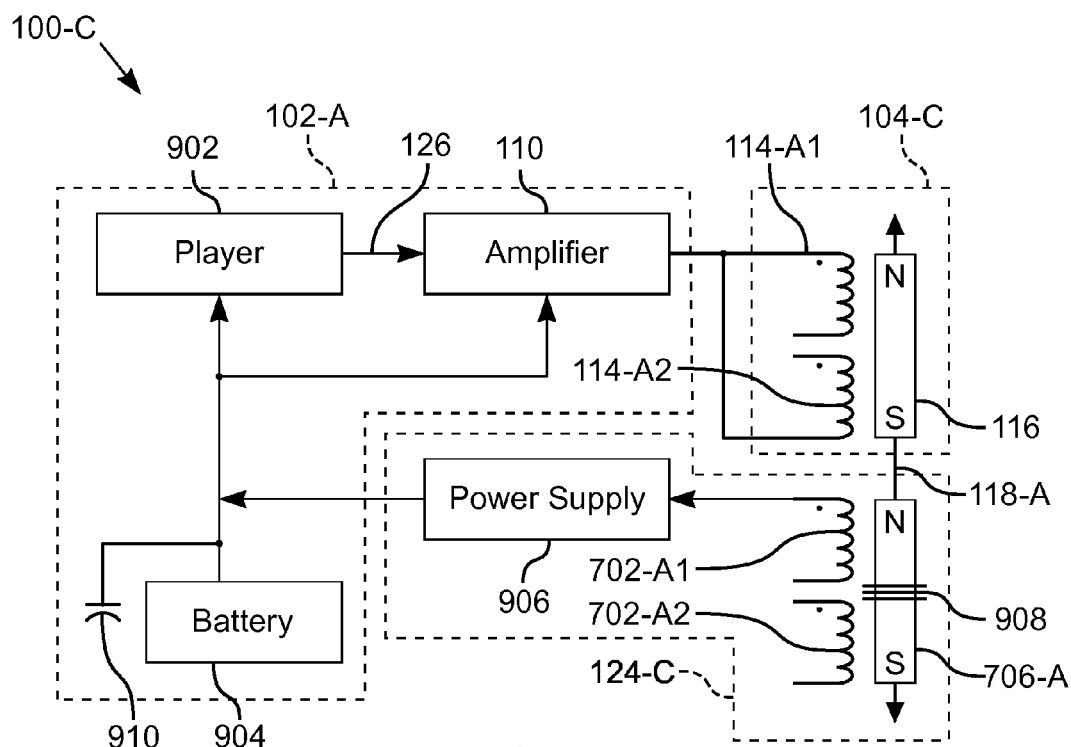
FIG. 9 is a simplified block diagram of yet another embodiment of an energy conversion device.

FIG. 9 is an illustration of a block diagram of another embodiment of an energy conversion device 100-C. The illustrated embodiment of the energy conversion device 100-C includes another embodiment of the driver 102-A connected to another embodiment of the motor 104-C, which is connected to another embodiment of the load 124-C.

The driver 102-A includes a player 902 that is a signal source with an output being a signal 126 sent to an amplifier 110. A battery 904 provides power to the player 902 and the amplifier 110. In one embodiment, a capacitor 910 is connected across the battery 904. The capacitor 910 is sized to store energy, such as necessary to accommodate power surges.

In one embodiment the player 902 is a device that stores and plays audio-type files, such as WAV or MP3 files, that are representative of the signal 126. The player 902 in one embodiment is a digital device that stores and manipulates digital data files to output a signal 126. The player 902 stores one or more files that are played as selected. In one such embodiment, the file is played repeatedly in a continuous cycle to form the analog signal. In another embodiment, the player 902 is an analog device that generates or plays a stored signal. In one embodiment, the player 902 includes a remote control console, which is a controller for the player that allows control of the player 902 from a location separate from the player 902 output section, which is connected to the amplifier 110.

The output from the player 902 is the signal 126, which is input to the amplifier 110. In one embodiment, the amplifier 110 is a monoblock amplifier with a frequency response that extends from less than 5 Hz to more than 20 kHz. In one such embodiment, the amplifier 110 is a Class D high current audio amplifier suitable for connect to a 1 ohm, 2 ohm, 4 ohm, or other impedance load. In another such embodiment, the amplifier is a hybrid Class GH amplifier. In another embodiment the amplifier 110 operates within the infrasonic range with no low frequency filtering. In one embodiment, the infrasonic range is defined to be between 0 Hertz (dc) and some low frequency, such as 20 Hertz or more. The frequency range of the amplifier 110 encompasses the maximum frequency of the signal 126 required to operate the energy conversion device 100 at its maximum speed. Additionally, an amplifier 110 with high efficiency is desirable to minimize system losses.

The motor 104-C includes a pair of coils 114-A1, 114-A2 that are magnetically coupled to the motor magnet 116. In the illustrated embodiment, the coils 114-A1, 114-A2 are wired in parallel with one coil 114-A1 connected to the opposite polarity connect of the other coil 114-A2. In this way, the magnetic field of each coil 114-A1, 114-A2 have opposite polarity and the fields interact with the poles N, S of the motor magnet 116 to maximize efficiency. In one embodiment, the motor coils 114-A1, 114-A2 are 4 ohm coils, such as voice coils for high power drivers.

Connected to the motor magnet 116 is a shaft 118-A that is connected to a load magnet 706-A. The load 124-C includes a load magnet 706-A, a plurality of load coils 702-A1, 702-A2, and a power supply 906. The load magnet 706-A, in the illustrated embodiment, consists of two or more permanent magnets that have at least one metal plate or disk 908 therebetween. The load magnet 706-A is magnetically coupled to the load coils 702-A1, 702-A2.

One load coil 702-A1 is connected to a power supply 906, which has an output connected to the battery 904 connections to the player 902 and amplifier 110. The other load coil 702-A2 is available to provide power to external devices.

The power supply 906 is a device that converts the electrical output of the load coil 702-A1 to an electrical output suitable for charging the battery 904 and/or supplying the power requirements of the player 902 and amplifier 110. In one such embodiment, the power supply 906 includes a rectifier that converts the output of the load coil 702-A1 to a direct current, which is then converted to the appropriate voltage level, such as through a switching power supply. In another such embodiment, the power supply 906 includes a transformer or other voltage conversion circuit that provides power to a rectifier circuit. In one such embodiment, the power supply 906 also includes a battery charging circuit to charge the battery 904.

In another embodiment, the load 124-C is a rotary device such as illustrated in FIGS. 1 & 2, instead of a linear generator as illustrated in FIG. 9. A rotary generator is connected to the crankshaft 122 and provides electrical power to the power supply 906 and external loads, if desired. In one such embodiment, another rotary device can be connected to the crankshaft 122 and powered from the load 124-A.

In yet another embodiment, energy conversion device 100 is a hybrid device. In such an embodiment, the linear load 124-C is mechanically connected to a rotary load 124-A. The linear load 124-C produces the desired electrical output and the rotary load 124-A serves as a stroke limiter, thereby eliminating the need for the stops 804-A, 804-B and the spring 806.

Figure 10:
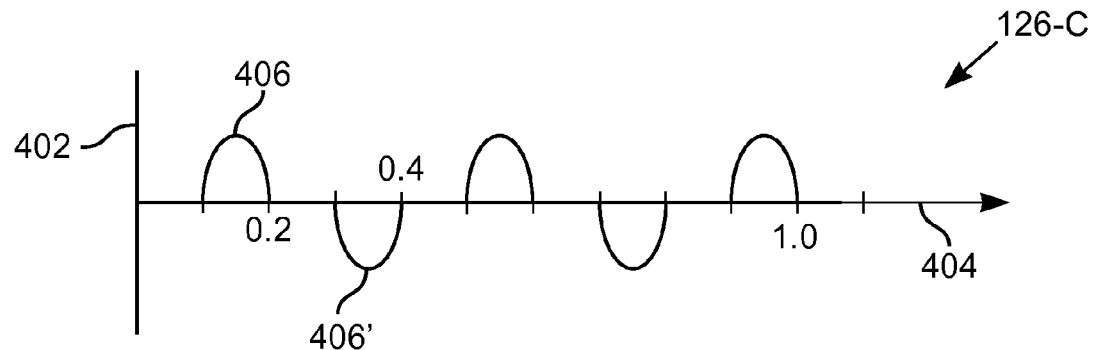
FIG. 10 is an illustration of a graph of another embodiment of a signal for the energy conversion device.

FIG. 10 illustrates a graph of another embodiment of a signal 126-C of the driver 102. The amplitude 402 of the signal 126-C over time 404 (in seconds) is shown in the graph. The signal 126-C has one positive going snippet 406 and one negative going snippet 406'. In the illustrated embodiment, each snippet 406, 406' is a half-wave of a 5 Hz sine wave. The two snippets 406, 406' are illustrated with a 50% duty cycle, that is, there is a gap between adjacent snippets 406, 406' equal to the period of the snippets 406, 406'. The gap between the 406, 406' allows the magnet 116 to change direction.

The illustrated signal 126-C is appropriate for driving the loads 124-B illustrated in FIGS. 7 and 9. The linear generator of the load 124-B does not have a signal 126-C with a starting region as illustrated in FIGS. 4 and 5 because the load 124-B starts with little inertial loading.

In one embodiment, the signal generator 106 or player 902 plays a recorded file that includes the snippet 406. The signal generator 106 or player 902 repeats the snippet 406 at selected intervals with every second snippet 406' inverted. With the illustrated signal 126-C, the shaft 118-A reciprocates at 2.5 cycles per second. By decreasing the gap between snippets 406, 406', the shaft 118-A will reciprocate at a maximum of 5 cycles per second. For faster reciprocation rates, the tempo or the frequency of the snippet 406 is increased or a portion of the peak of the waveform is used that has a period sufficient to support the desired maximum reciprocation rate. For example, the portion of the snippet 406 illustrated between 0.14 and 0.16 seconds is used instead of the complete half cycle.

Figure 11:
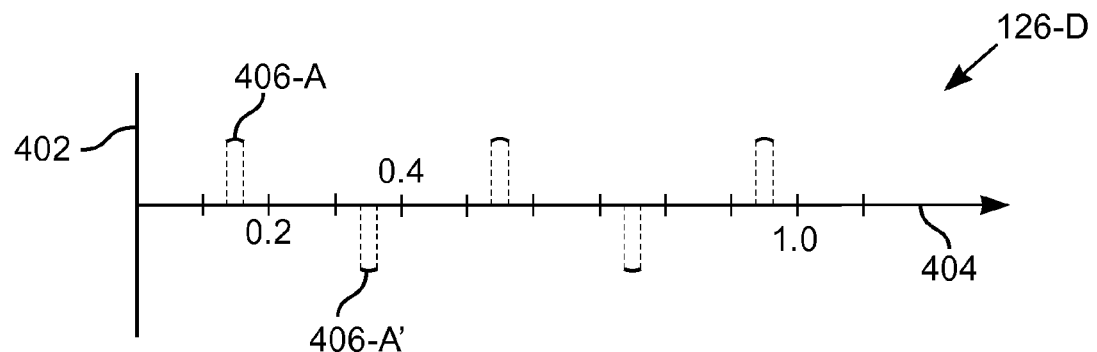
FIG. 11 is an illustration of a graph of yet another embodiment of a signal for the energy conversion device.

FIG. 11 illustrates a graph of yet another embodiment of a signal 126-D of the driver 102. The amplitude 402 of the signal 126-C over time 404 (in seconds) is shown in the graph. The analog signal 126-D has one positive going snippet 406-A and one negative going snippet 406-A'. In the illustrated embodiment, each snippet 406-A, 406-A' is a narrow portion of a peak part of a half-wave of a 5 Hz sine wave. In another embodiment the snippets 406-A, 406-A' are square waves. The two snippets 406-A, 406-A' are illustrated with a 12.5% duty cycle, that is, there is a gap between adjacent snippets 406, 406' equal to about seven times the period of the snippets 406-A, 406-A'.

By varying the width of the snippets 406-A, 406-A', the duty cycle is changed and the amount of power developed by the motor 104 is varied. To change the speed of the motor 104, the number of snippets 406-A, 406-A' for a specified period changes the rate the motor 104 reciprocates, with each positive going snippet 406-A forcing the shaft 118 in one direct and each negative going snippet 406-A' forcing the shaft 118 in the opposite direction.

Figure 12:
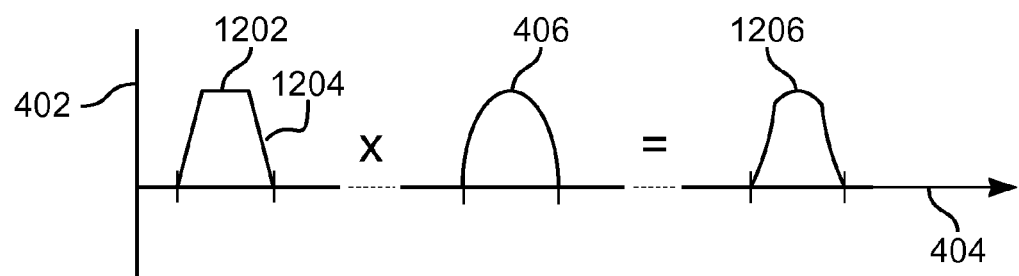
FIG. 12 is an illustration of a graph of two signals and a resulting signal.

FIG. 12 illustrates a graph of two signals 1202, 406 and a resulting signal 1206. In one embodiment, the snippets 406 illustrated in FIGS. 4, 5, and 10 are processed to form a modified snippet 1203. The leading and trailing portions of the half-wave snippet 406 is multiplied by a signal 1202 with a waveform that has a ramping leading and trailing edge with full gain therebetween. The full gain portion is applied to a portion of the peak of the half-wave snippet 406. Multiplying the two signals 1202, 406 produces a modified snippet 1206 that has a longer rise time initially with an increasing slope as the peak is reached, that is, the snippet 1206 fades in. In one such embodiment, the leading and trailing portions of the snippet 406 fade in and fade out at about 33 degrees.

Figure 13:
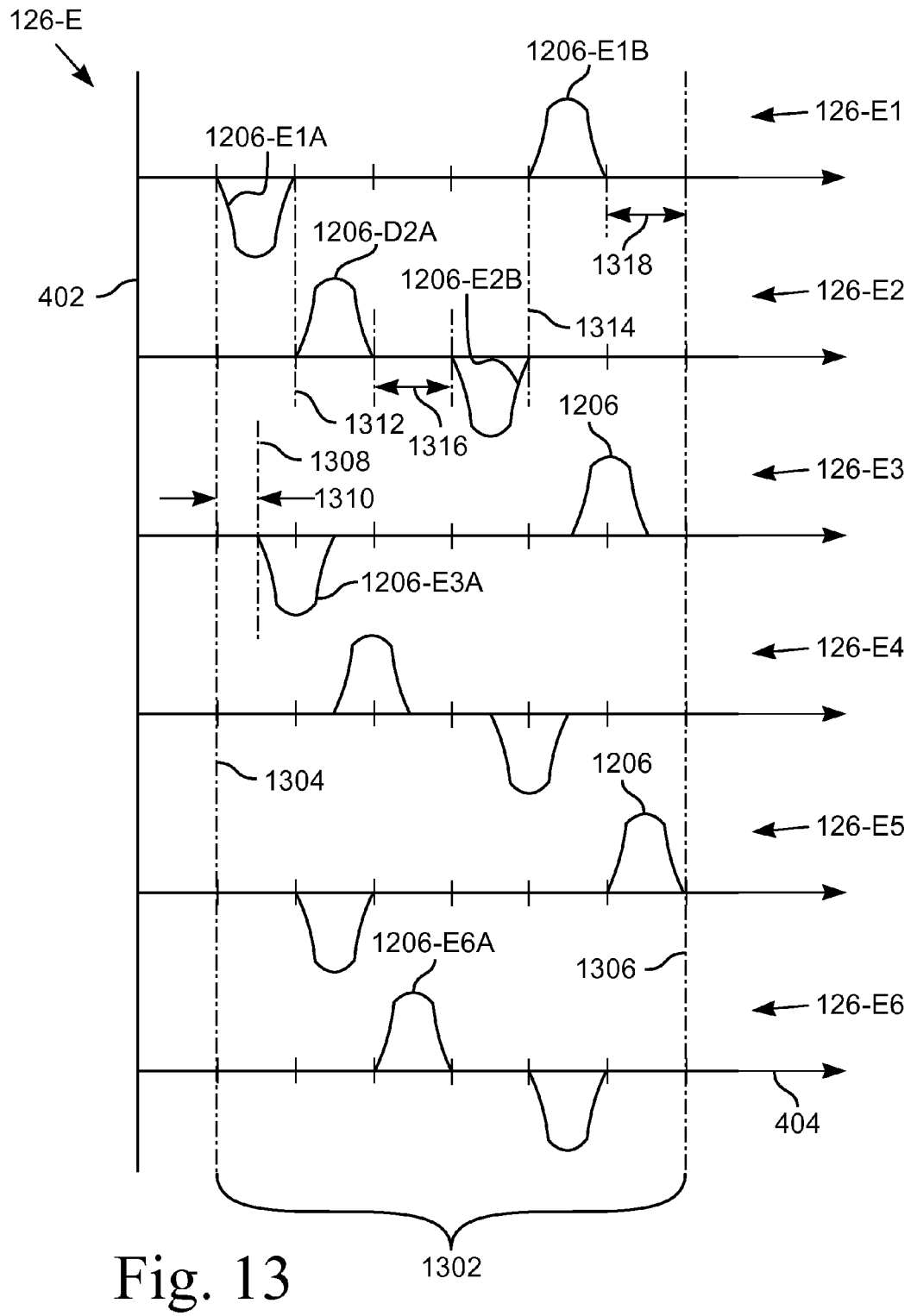
FIG. 13 is an illustration of a graph of yet another embodiment of a group of signals.

FIG. 13 illustrates a graph of yet another embodiment of a group of signals 126-E. The illustrated embodiment has six tracks 126-E1 to E6 defined within a loop region 1302 that has a start time 1304 and an end time 1306. The signal 126-E in the loop region 1302 repeats or loops to produce a continuous signal 126-E. Three of the tracks 126-E1, 126-E3, 126-E5 correspond to a right channel and are mixed to create a first composite signal 126-R. The other three tracks 126-E2, 126-E4, 126-E6 correspond to a left channel and are mixed to create a second composite signal 126-L.

In the illustrated embodiment, the modified snippets 1206 shown in FIG. 12 are used to create the signal 126-E. The first track 126-E1 has a first snippet 1206-E1A that is negative. The second track 126-E2 has a first snippet 1206-E2A that is positive with a starting time 1312 that coincides with the ending time 1312 of the first snippet 1206-E1A of the first track 126-E1. The third track 126-E3 has a first snippet 1206-E3A that is negative with a start time 1308 that is time or phase shifted from the start time of the first snippet 1206-E1A of the first track 126-E1 by ¼ cycle or 90 degrees. In other embodiments, the time or phase shift of the first snippets 1206-E1A, 1206-E3A is set at a different value, for example, the time or phase shift is at ⅙ cycle or 60 degrees, which results in a signal free gap between the first and second snippets of the signal 126-E.

Like the third track 126-E3, the fifth track 126-E5 has a negative the first snippet that is time or phase shifted from the first snippet 1206-E3A of the third track 126-E3 by ¼ cycle or 90 degrees. The first snippet of the fourth and sixth tracks 126-E4, 126-E6 have a similar relationship to the first snippet of the previous track 126-E3, 126-E5 as does the second track 126-E2 to the first track 126-E1.

The second snippet 126-E2B of the second track 126-E2 is negative and the second snippet 126-E1B of the first track 126-E1 is positive with a start time 1314 coinciding with the end time 1314 of the second snippet 126-E2B of the second track 126-E2. The second snippets of the third through sixth tracks 126-E3 to -E6 have a similar relation as does the first and second tracks 126-E1, 126-E2 and with a time or phase shift similar to that of the first snippets 1206-E1A, 1206-E2A.

The time gap 1318 between the end of the second snippet 126-E1B of the first track 126-E1 and the end 1306 of the loop segment 1302 is equal to the time gap 1316 between the end of the first snippet 126-E2A and the start of the second snippet 126-E2B of the second track 126-E2. The time gaps 1316, 1318 between these snippets corresponds to the stroke of the motor 104. Generally, a longer stroke requires greater time between the snippets.

In various embodiments, the signal generator 106 and processor 108 or the player 902 produces the signal for each of the tracks 126-E1 to E6 and combines them to produce the signal 126-L, 126-R that is sent to the amplifier 110.

Figure 14:
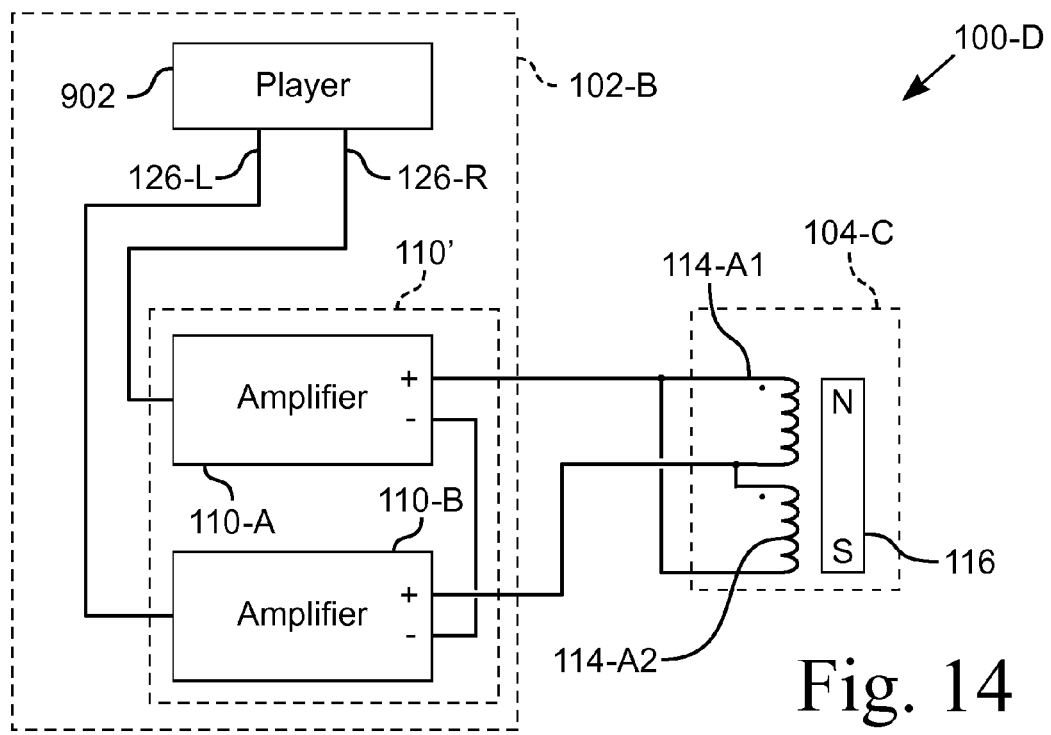
FIG. 14 is a simplified diagram of another embodiment of a driver.

FIG. 14 illustrates a simplified diagram of another embodiment of a driver 102-B. The illustrated embodiment of the energy conversion device 100-D includes a driver 102-B and a motor 104-C. The driver 102-B includes a player 902 and an amplifier 110'. In another embodiment the player 902 is replaced by a signal generator 106 and a signal processor 108. The amplifier 110' in the illustrated embodiment includes a pair of single channel amplifiers 110-A, 110-B. In another embodiment, the pair of amplifiers 110-A, 110-B are replaced with a single, multi-channel amplifier 110.

The player 902 has a pair of outputs for the two signals 126-R, 126-L. One signal 126-R from the player 902 is electrically connected to the input of one amplifier 110-A and the other signal 126-L is electrically connected to the other amplifier 110-B.

The outputs of the amplifiers 110-A, 110-B are series connected to the coils 114-A1, 114-A2, which are connected in parallel with opposite polarity leads connected. The positive output connection of each amplifier 110-A, 110-B is connected to the coils 114-A1, 114-A2 and the negative output connections are connected together. This connection configuration inverts the phase of one of the signals 126-L relative to the other signal 126-R. In another embodiment, the phase shift is implemented at the input of the amplifiers 110-A, 110-B by reversing the polarity of the input to one of the amplifiers 110-A, 110-B. In yet another embodiment, the phase shift is implemented by the player 902, which outputs a signal 126-R, 126-L that is inverted.

In one embodiment, the player 902 produces the two signals 126-R, 126-L from the tracks 126-E1 to -E6 by mixing tracks 126-E1, 126-E3, 126-E5 to produce a first composite signal 126-R and mixing tracks 126-E2, 126-E4, 126-E6 to produce a second composite signal 126-L. In another embodiment, the signal 126-E includes only the first two tracks 126-E1, 126-E2. In one such an embodiment, the first track 126-E1 corresponds to the first signal 126-R and the second track 126-E2 corresponds to the second signal 123-L.

Figure 15:
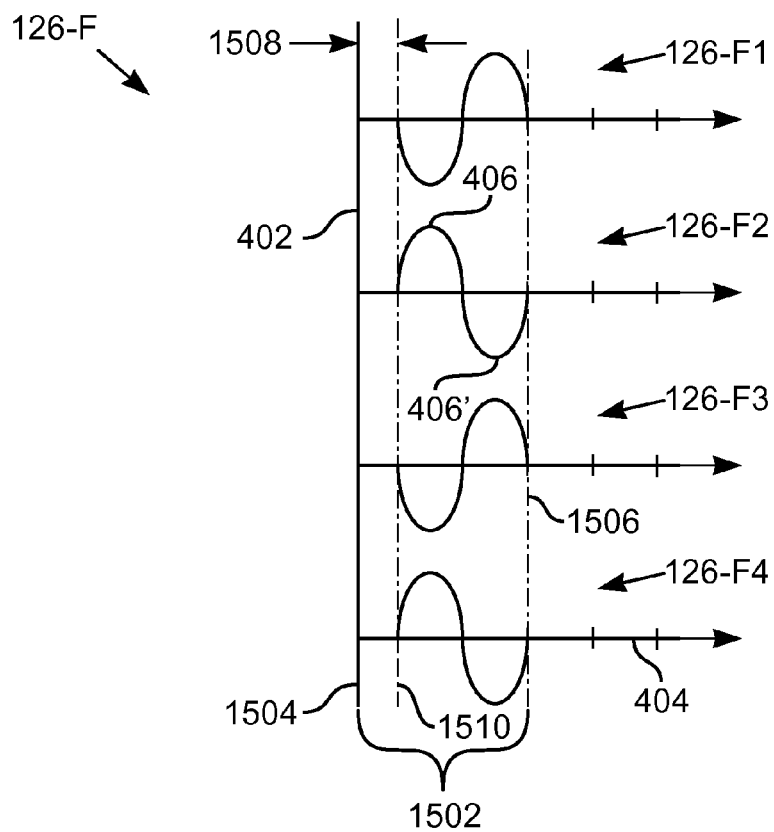
FIG. 15 is an illustration of a graph of yet another embodiment of a group of signals.

FIG. 15 illustrates a graph of yet another embodiment of a group of signals 126-F. The illustrated embodiment has four tracks 126-F1 to F4 defined within a loop region 1502 that has a start time 1504 and an end time 1506. The signal 126-F in the loop region 1502 repeats or loops to produce a continuous signal 126-F. Two of the tracks 126-F1, 126-F3 correspond to a right channel and are mixed to create a first composite signal 126-R. The other two tracks 126-F2, 126-F4 correspond to a left channel and are mixed to create a second composite signal 126-L. The composite signals 126-R, 126-L are fed to the amplifier 110, 110'.

In one embodiment, the signal 126-F includes only two tracks 126-F1, 126-F2 that define the two signals 126-R, 126-L fed to the amplifier 110. In another embodiment, the signal 126-F includes additional tracks, such as the six tracks illustrated in FIG. 13. The benefit of more than one track per signal 126-L, 126-R is that, for certain equipment, the output level increases when the tracks are combined or mixed.

The loop region 1502 includes the snippets 406 and a time gap 1508 between the start of the loop 1504 and the start time 1510 of the snippets 406. In the illustrated embodiment, the snippets 406 have a half-wave sine waveform. In other embodiments, the snippets 406-A, 1206 have other waveforms.

The period of the gap 1508 corresponds to the stroke of the motor 104. Generally, a longer stroke requires greater time between the snippets. In one embodiment, the signal generator 106 and signal processor 108 repeated output the signal 126-F in the loop segment 1502 to produce a continuous signal 126-F. In another embodiment, the player 902 outputs the signal 126-F in the loop segment 1502 to produce a continuous signal 126-F.

Figure 16:
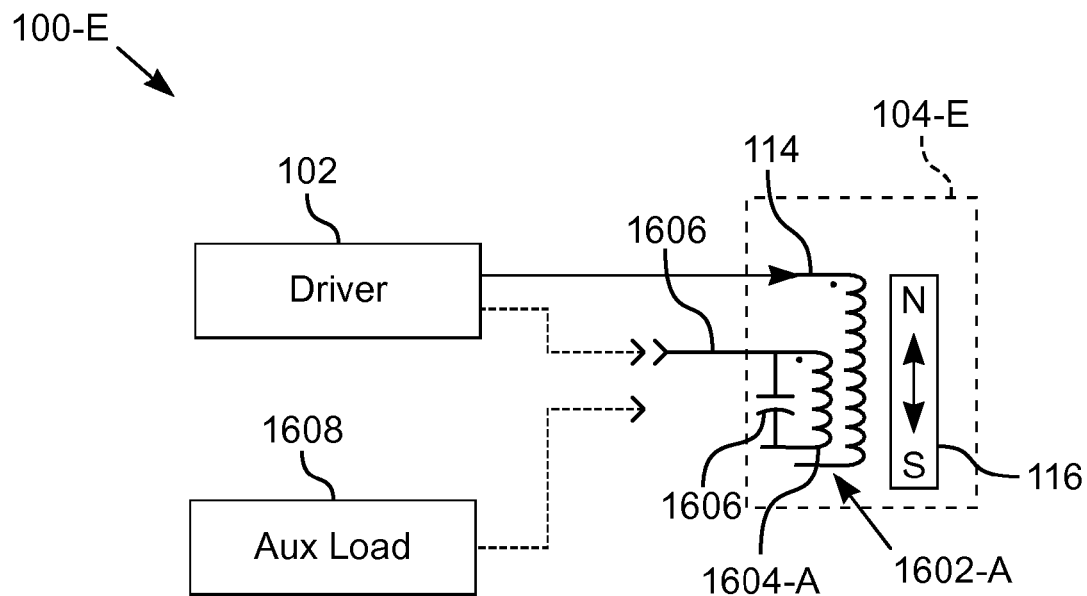
FIG. 16 is a simplified schematic diagram of still another embodiment of an energy conversion device.

FIG. 16 illustrates a simplified schematic diagram of still another embodiment of an energy conversion device 100-E. The energy conversion device 100-E includes a driver 102 and a motor 104-E. The motor 104-E includes a coil 114, a coil assembly 1602-A, and a magnet 116 that reciprocates in response to a magnetic field created by the coil 114. The coil 114 receives a signal from the driver 102. The coil assembly 1602-A is magnetically coupled to the first coil 114. The output 1606 of the coil assembly 1602 is suitable for providing power to the driver 102 and/or an auxiliary load 1608. The auxiliary load 1608 is any device that can utilize the power and/or signal provided from the coil assembly 1602.

In the illustrated embodiment the coil assembly 1602-A includes a coil 1604-A and a capacitor 1606. The coil 1604-A, which is the second one in the illustrated motor 104-E, is an output coil, compared to the first coil 114, which is an input coil. The second coil 1604-A is closely coupled to the first coil 114. For example, the windings of the second coil 1604-A are intertwined, or wound together, with the winding of the first coil 114. In this way the two coils 114, 1604-A are closely coupled magnetically and physically.

Figure 17:
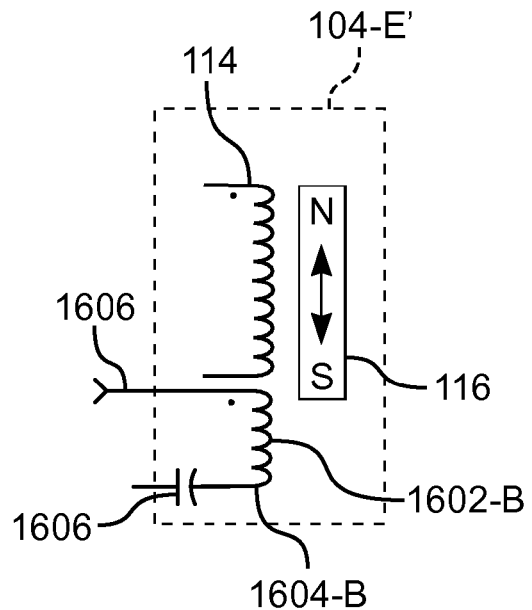
FIG. 17 is a simplified schematic diagram of another embodiment of the motor shown in FIG. 16.

The capacitor 1606 of the coil assembly 1602-A is illustrated in parallel with the coil 1604-A. In another embodiment, such as illustrated in FIG. 17, the capacitor 1606 is connected in series with the coil 1604-A. The capacitor 1606 forms a tuned circuit with the coil 1604. When the motor 104-E is operated at a constant rate, the tuned circuit of the capacitor 1606 and coil 1604 has a natural frequency corresponding to the frequency of the signal driving the input coil 114. In one embodiment the capacitor 1606 is variable. In such an embodiment adjusting the capacitor 1606 results in a change to the frequency of the tuned circuit, such as may be necessary to accommodate changes to the frequency of the signal from the driver 102.

FIG. 17 illustrates a simplified schematic diagram of another embodiment of the motor 104-E' shown in FIG. 16. The illustrated embodiment of the motor 104-E' shows the second coil 1604-A closely coupled to the first coil 114 with the windings separated, that is, the windings of each coil 114, 1604-B are not intertwined. For example, each coil 114, 1604-B is a separate winding that is configured such that the magnetic field generated by the input coil 114 interacts with the output coil 1604-B.

From the foregoing description, it will be recognized by those skilled in the art that an energy conversion device 100 has been provided. The energy conversion device 100 includes at least a driver 102 and a motor 104. In some embodiments, the energy conversion device 100 includes a load 124 connected to the motor 104. The driver 102 has a device 106 & 108, 902 that outputs a signal 126 that is amplified by a amplifier 110. The amplified signal drives a coil 114 in the motor 104. The coil 114 produces a magnetic field corresponding to the signal 126.

The magnetic field causes a magnet 116 to reciprocate. The reciprocating magnet 116 transfers energy to the load 124.

While the present invention has been illustrated by description of several embodiments and while the illustrative embodiments have been described in considerable detail, it is not the intention of the applicant to restrict or in any way limit the scope of the appended claims to such detail. Additional advantages and modifications will readily appear to those skilled in the art. The invention in its broader aspects is therefore not limited to the specific details, representative apparatus and methods, and illustrative examples shown and described. Accordingly, departures may be made from such details without departing from the spirit or scope of applicant's general inventive concept.

What is claimed is:

1. An apparatus for energy conversion, said apparatus comprising:
    a signal source having an output providing a signal, said signal including a plurality of snippets, each one of said plurality of snippets defined by a specific waveform, said plurality of snippets defining a series of snippets;
    an amplifier electrically connected to said output of said signal source, said amplifier having an amplifier output;
    a first coil assembly electrically connected to said amplifier output, said first coil assembly generating a magnetic field in response to said amplifier output;
    a first magnet engaging said magnetic field generated by said first coil assembly, said first magnet constrained to move in one axis with a reciprocal motion in response to said magnetic field; and
    a second coil assembly magnetically coupled to said first coil assembly, said second coil assembly including a capacitor.

2. The apparatus of claim 1 wherein said first coil has a first winding and said second coil has a second winding, said second winding intertwined with said first winding.

3. The apparatus of claim 1 wherein said capacitor is electrically connected parallel to a winding of said second coil assembly.

4. The apparatus of claim 1 wherein said capacitor is electrically connected in series with a winding of said second coil assembly.

5. The apparatus of claim 1 wherein said second coil assembly provides an output in response to said magnetic field from said first coil assembly.

6. The apparatus of claim 5 wherein said output of said second coil assembly is electrically connected to said signal source.

7. The apparatus of claim 5 wherein said output of said second coil assembly is electrically connected to an auxiliary load.

8. The apparatus of claim 1 wherein a primary load is coupled to said first magnet, and said primary load includes a converter providing rotary motion in response to said reciprocal motion.

9. An apparatus for energy conversion, said apparatus comprising:
    a driver having a signal source and an amplifier, said signal source providing a signal to said amplifier, said signal including a loop segment that includes a snippet, said snippet defined as a portion of a half-wave of an alternating signal, said loop segment repeated to form a continuous stream; and
    a motor having a first winding and a motor magnet configured to move relative to said winding, said first winding in electrical communication with said amplifier, when said first winding is energized said first winding produces a magnetic field that engages said motor magnet, thereby causing a relative motion between said motor magnet and said first winding, and said motor having a second winding providing an output of electrical power, said second winding magnetically coupled to said first winding.

10. The apparatus of claim 9 wherein said second winding is intertwined with said first winding.

11. The apparatus of claim 9 further including a capacitor electrically connected parallel to said second winding.

12. The apparatus of claim 9 further including a capacitor electrically connected in series with said second winding.

13. The apparatus of claim 9 wherein said output of said second winding is electrically connected to said driver.

14. The apparatus of claim 9 wherein said output of said second winding is electrically connected to an auxiliary load.

15. An apparatus for energy conversion, said apparatus comprising:
    a signal source having an output providing a signal, said signal including a plurality of snippets, each one of said plurality of snippets defined by a specific waveform, said plurality of snippets defining a series of snippets;
    an amplifier electrically connected to said output of said signal source, said amplifier having an amplifier output;
    a first coil assembly electrically connected to said amplifier output, said first coil assembly generating a magnetic field in response to said amplifier output; and
    a first magnet engaging said magnetic field generated by said first coil assembly, said first magnet constrained to move in one axis with a reciprocal motion in response to said magnetic field.

16. The apparatus of claim 15 wherein a second coil assembly is magnetically coupled to said first coil assembly, and said second coil assembly providing an output.

17. The apparatus of claim 16 wherein said second coil assembly further includes a capacitor.

18. The apparatus of claim 16 wherein said second coil assembly further includes a capacitor, said capacitor having a capacitance selected to define a resonant frequency of said second coil assembly, said resonant frequency related to a frequency of said signal.

19. The apparatus of claim 15 wherein a primary load is coupled to said first magnet, said primary load including a converter providing rotary motion in response to said reciprocal motion.

20. The apparatus of claim 15 wherein said second winding has an output electrically connected to an auxiliary load.

* * * * *